United States Patent

[11] 3,569,860

[72] Inventor  Eugene T. Booth
    Briarcliff Manor, N.Y.
[21] Appl. No. 821,165
[22] Filed  Apr. 25, 1969
[45] Patented  Mar. 9, 1971
[73] Assignee  American Optical Corporation
    Southbridge, Mass.
    Continuation-in-part of application Ser. No.
    384,115, July 21, 1964, now abandoned,
    which is a continuation-in-part of
    application Ser. No. 215,669, Aug. 8, 1962,
    now abandoned.

[54] LASER STRUCTURE COMPRISING A PLURALITY OF LASER MATERIAL SEGMENTS FOR HIGH POWER DISSIPATION
    9 Claims, 4 Drawing Figs.

[52] U.S. Cl. ................................................. 331/94.5
[51] Int. Cl. .................................................. H01s 3/04
[50] Field of Search ..................................... 331/94.5;
                                                330/4.3; 250/199

[56]  References Cited
    UNITED STATES PATENTS
    3,311,846  3/1967  Simpson et al. ...............  331/94.5

*Primary Examiner*—William L Sikes
*Attorneys*—Amster and Rothstein, William C. Nealson, Noble S. Williams, Robert Bird and Bernard L. Sweeney ABSTRACT: In a laser structure having means for establishing a predetermined laser light propagation direction, a series of thin parallel-faced plates of laser material disposed in closely spaced parallel relation to one another with their opposite faces positioned to be traversed by laser light travelling in the aforementioned propagation direction, and a fluid coolant occupying the space between each pair of adjacent thin plates of laser material. The described assembly may be disposed within a container for confining the fluid coolant and means may be provided for effecting circulation of the coolant through the container.

Patented March 9, 1971

3,569,860

INVENTOR.
EUGENE T. BOOTH
BY
ATTORNEY

LASER STRUCTURE COMPRISING A PLURALITY OF LASER MATERIAL SEGMENTS FOR HIGH POWER DISSIPATION

This application is a continuation-in-part of Ser. No. 384,115, LASER STRUCTURES, filed Jul. 21, 1964, by Eugene T. Booth, inventor, now abandoned, which is a continuation-in-part of Ser. No. 215,669, LASER STRUCTURES, filed Aug. 8, 1962 by Eugene T. Booth, inventor, now abandoned.

LASER STRUCTURES

This invention relates to masers or lasers and has for one of its objects to provide a maser or laser structure which is peculiarly adapted to be operated at optimum temperature conditions.

A laser structure described by Townes and Schawlow (Phys. Rev. Vol. 112, p. 1940, 1958) consists of a rod of lasering material of length about 10 diameters, silvered on one end and partially silvered for about 2 percent transmission on the other end. This arrangement produces a high-Q resonant cavity between the mirrors of the Fabry-Perot type. When the lasering material is strongly illuminated with broad band or white light, an excess of population of atoms, in an upper lasering state is produced. This process is called optical pumping. Due to stimulated emission of these excited atoms by multiply-reflected light between the mirrors, the laser action takes place. The multiply-reflected light is greatly amplified, and a portion of it emits through the partially silvered end as highly monochromatic, highly parallel laser light.

One solid lasering material now known is ruby, and another is neodymium glass.

Under the above conditions a substantial amount of pumping light is required to produce the excess population of excited state atoms. The amount of pumping illumination required to produce laser action in ruby is approximately 500 watts per cubic centimeter, and the amount required for neodymium glass is about 50 watts per cubic centimeter. This pumping light produces heat in the lasering material, and unless special precautions are taken for removing this heat, deleterious temperature rises will result in the lasering material. It will be shown that temperature rises in the lasering materials of ruby and glass must be kept uniform to within about 1° C. or less in order for the Fabry-Perot cavity amplification to take place without loss of efficiency.

According to this invention, I employ laser structures in the form of axially disposed parallel discs, which may be efficiently used while maintaining optimum temperature conditions.

Consider a Fabry-Perot cavity consisting of a dielectric medium of index of refraction N, and length D, with plane parallel reflecting faces. Plane light waves will be amplified through multiple reflection in a direction perpendicular to the faces of the plates if the following condition maintains:

$$N' = \frac{2DN}{\lambda_o} \quad (1)$$

where $N'$ is an integer and $\lambda_o$ is the wavelength of the light in vacuum. Amplification will also take place for light making certain small angles with the above normal direction where relation (1) maintains. At angles other than the above, the light is not amplified. In laser design one of the objectives is to restrict the useful amplification to the first few allowed angles, or modes, and thus secure as nearly parallel light output as possible.

Now relation (1) is based upon the assumption that the lasering material between the mirrors is homogeneous, with index of refraction N constant throughout the volume. If the temperature of the lasering material is changed uniformly, two things happen: 1) D changes because of the linear thermal expansion of the material, and 2) the index of refraction N changes in the direction perpendicular to laser light propagation direction, such changes being referred to herein as a "lensing effect". These changes are primarily due to a change of density of the material with temperature. Temperature gradients in the lasering material are particularly bad, because under these conditions one part of the wave front in the interferometer may be amplified while another part may not be, causing a loss of efficiency. The elimination of lensing effects in particular, is considered important enough to sacrifice some pumping efficiency due to the less laser material being exposed to the commonly used horizontally disposed flashtube with the use of laser discs. The importance of eliminating such lensing effects is underscored by an understanding of the great importance placed upon the greatest possible pumping efficiency at the date of filing of my original application.

By careful test procedure the effect of temperature upon optical path in glass Fabry-Perot plate has been determined. Specifically it was found for a glass 1.26 cms. thick a temperature change of 1.6° C. caused the pattern of the Fabry-Perot interference fringes in the perpendicular direction to change from light to dark to light.

Additional tests show that temperature gradients markedly distorted the Fabry-Perot interference pattern in the same glass plate.

These observed changes are due principally to changes in index of refraction due to temperature changes. These observations place a strong requirement upon controlling the temperatures of lasering materials for efficient operation.

One satisfactory way, which I now consider preferable, of removing the heat from the lasering material is to maintain a circulating transparent fluid over the surfaces of the solid lasering material, with the configuration of said material being such as to substantially eliminate lensing effects.

Suitable means for maintaining a nearly constant temperature in the lasering material are hereinafter described.

This invention is concerned with producing lasering structures composed of lasering material having a relatively large heat conductivity. In some cases it is advantageous to keep the lasering material at subnormal temperatures.

By arranging the illumination which provides the necessary pumping and by adjusting the effective absorption coefficient of the lasering material at an approximately uniform rate throughout the volume of the lasering material.

The effective absorption coefficient for pumping light can be controlled in some lasering materials by adjusting the percentage of "doping" in the substance. For example, the amount of chromium "doping" in ruby can be varied over a rather wide limit.

The form of the lasering material and the structure of the laser should be arranged, for heat exchange purposes, so that temperatures in the lasering material should be uniform and should not rise high enough to allow $N'$ to change by more than about one-fourth unit over the entire aperture of the laser. Also, lensing effects caused by temperature over that aperture in a direction perpendicular to the direction of laser light should be thereby substantially eliminated by heat flow being encouraged by the design and apparatus in the direction of laser light. Methods for doing this will be described hereinafter.

At this point it is desirable to consider more specifically the light intensity in a rectangular slab illuminated from both sides with parallel light of equal intensities.

Suppose the slab of absorptive material extends from $x = 0$ to $x = d$, and that parallel light falls upon the slab along the $x$ axis both from the left and from the right. Find the intensity at all points $x$ in the slab.

The light entering from the left is exponentially absorbed according to the relation $$y = \frac{I_x}{I_o} = e^{-\alpha x}$$

where I is the intensity in ergs per cm.² per second.

The light entering from the right decays exponentially according to the relation.

$$y' = \frac{Ix'}{I_o} = e^{a(x-d)}$$

$$S = y + y' = e^{-ax} + e^{a(x-d)}$$

at $x = 0$:

$$S_o = 1 + e^{-ad}$$

at $x = d/2$:

$$S_{d/2} = 2e^{-ad/2}$$

In the tables are shown, for various values of $d$, the values of $S$, $S_{d/2}$, the differences, and percent differences. It is seen that for values of $d$ of $0.6/$, or less, the difference is less than 5 percent.

| d | $1+e^{-ad}$ | $2e^{-ad/2}$ | Δ | Percent Δ |
|---|---|---|---|---|
| 0 | 2.0000 | 2.0000 | .0000 | 0 |
| 0.2/α | 1.8187 | 1.8096 | .0091 | 0.50 |
| 0.4/α | 1.6703 | 1.6374 | .0329 | 1.97 |
| 0.6/α | 1.5488 | 1.4816 | .0672 | 4.34 |
| 0.8/α | 1.4493 | 1.3406 | .1087 | 7.50 |
| 1/α | 1.3679 | 1.2130 | .1549 | 11.32 |
| 1.2/α | 1.3012 | 1.0976 | .2036 | 15.64 |

For $d$ $0.6/$, the values of the light intensity for various values of $x$, between $x$ $0$, and $x$ $d$, are given in the following table:

| | S | y | | y | e | | e | e | 0.6 |
|---|---|---|---|---|---|---|---|---|---|
| x | aX | | $e^{a-x}$ | | $e^{-ax}$ | | $e^{ax}e^{-.6}$ | $e^{-ax}+e^{ax}e^{-0.6}$ | |
| 0 | 0 | | 1 | | 1 | | 0.5488 | 1.5488 | |
| 0.1/α | 0.1 | | 1.1052 | | 0.9048 | | 0.6065 | 1.5113 | |
| 0.2/α | 0.2 | | 1.2214 | | 0.8187 | | 0.6703 | 1.4890 | |
| 0.3/α | 0.3 | | 1.3499 | | 0.7408 | | 0.7408 | 1.4816 | |
| 0.4/α | 0.4 | | 1.4918 | | 0.6703 | | 0.8187 | 1.4890 | |
| 0.5/α | 0.5 | | 1.6487 | | 0.6065 | | 0.9048 | 1.5113 | |
| 0.6/α | 0.6 | | 1.8221 | | 0.5488 | | 1.000 | 1.5488 | |
| 0 | | | | | | | | | |

The temperature distribution in a rectangular slab of material heated at a uniform rate per unit volume and with the two faces maintained at temperature $u$ will now be discussed.

Suppose a slab of thickness $2a$ is placed symmetrically about the $y$-axis. Further suppose that the heating in the slab is at the rate of $F$ calories per second per cubic centimeter.

The equation for the heat flow is:

$$C\delta \frac{\partial u}{\partial t} = K\nabla^2 u + F$$

Where
- k   conductivity
- D   specific heat
- density

In steady state, in rectangular coordinates:

$$K \frac{d^2 u}{dx^2} = -F$$

At $x = a$ $$\left[\left(\frac{du}{dx}\right) x = a\right] = -\frac{Fa}{K}$$
$$u = u_o$$

Under these conditions the solution for the equation is:

$$u = u_o - \frac{F}{2K} x^2 + \frac{Fa^2}{2K}$$

The temperature distribution in a long cylinder heated at a uniform rate per unit volume and with surface maintained at temperature $u$ will be considered as follows:

The equation for heat flow is:

$$C\delta \frac{\partial u}{\partial t} = K\nabla^2 u + F$$

In steady state, in cylindrical coordinates:

$$\frac{d^2 u}{dr^2} + \frac{1}{r}\frac{du}{dr} + \frac{F}{K} = \theta$$

$$\left[\left(\frac{du}{dr}\right) r = a\right] = -\frac{a}{2}\frac{F}{K}$$
$$u = u_o$$

Under these conditions the solution for the differential equation is:

$$u = u_o - \frac{Fr^2}{4K} + \frac{Fa^2}{4K}$$

Referring to the drawings.

Figure 1:
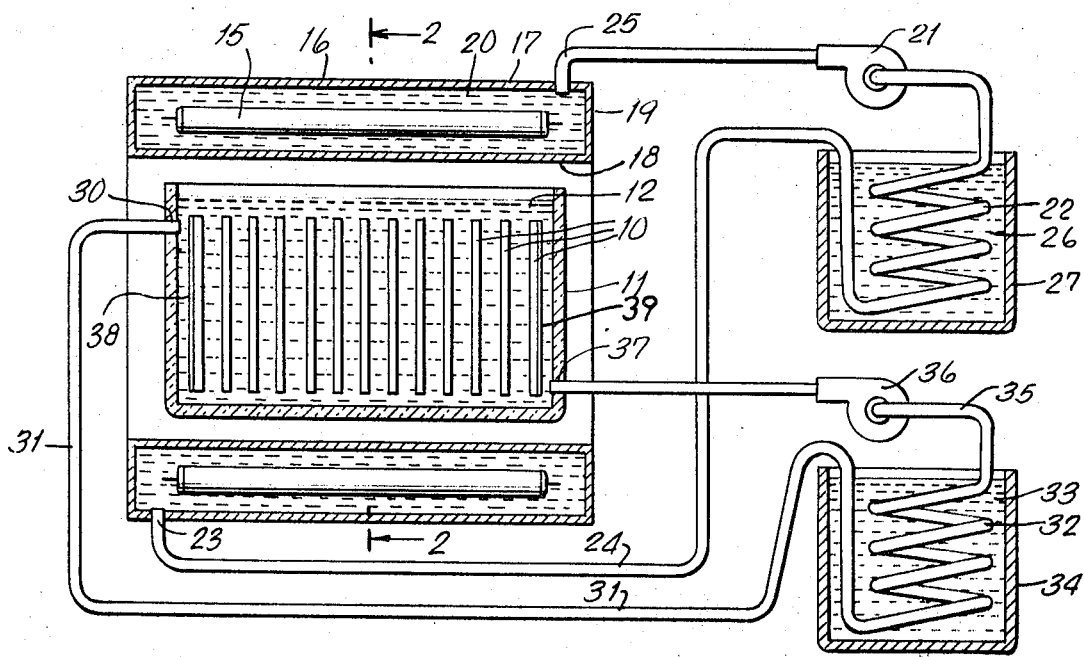
FIG. 1 is a partially sectional elevation of a laser structure in which the solid lasering material is subdivided into a plurality of plates and liquid coolant is circulated through the container in which the plates are located.

Referring to FIG. 1, a plurality of solid plates 10 of lasering material, for example ruby or neodymium glass, are spaced closely from each other and disposed in a transparent tank or container 11. One end plate has a reflecting mirror 38, and the opposite end plate has a reflecting mirror 39 which is designed to permit 2 percent transmission so that the stack of plates acts like a solid rod and produces a high-Q resonant cavity between the mirrors which thus constitute a Fabry-Perot dielectric resonant cavity. The tank 11 is filled so as to immerse all of the plates 10 with a transparent liquid coolant 12, which may for example consist of distilled water (H 0) which is satisfactory for a lasering operation in the visible spectrum but should consist of heavy water (D 0) which I have found to be very important and satisfactory for use in the infrared spectrum with wavelengths for example in the order of 1.06 microns. The tank 11 is surrounded by a plurality of high-pressure mercury arc light tubes 15 which are located within a cylindrical jacket 16 having an outer wall 17 with a mirrored inside surface and an inner wall 18 with end closures 19.

The structure 16 is made of glass or plastic material, which is transparent, and the jacket, which may be either cylindrical or square with rounded corners, is filled as above explained with H 0 or D 0 or other suitable transparent liquid for cooling the high-pressure mercury arc light tubes. The transparent liquid indicated at 20 may be supplied continuously from an adequate source, but preferably the transparent liquid is circulated by pump 21 through a coil 22 from an outlet connection 23 through pipe 24, through coil 22, through pump 21 and through inlet connection 25. Coil 22, for purposes of illustration, is shown immersed in a body of liquid 26 in container 27. The liquid 26 may be brine or other refrigerant for keeping the water in the cylindrical jacket at the desired temperature.

The liquid refrigerant 26 is usually at a very much lower temperature than the temperature of the water in the jacket 16, and the transparent coolant 12 is circulated from outlet 30 through pipe 31 through a refrigerating means indicated at 32 and immersed in liquid bath 33 in tank 34. The liquid from coil 32 goes through pipe 35, pump 36 and enters tank 11 at inlet 37.

The plates 10 of lasering material, which are thin and closely spaced, act like a solid rod of lasering material, but the fact that the material is subdivided into plates greatly facilitates the cooling of the laser in operation, so that the most advantageous temperature may be maintained even when the laser is operated continuously. For the best results the cooling fluid should be maintained at a constant temperature and supplied to the laser plates at     C. The flow of coolant should be adjusted so that the exit temperature as it is withdrawn from the tank is preferably limited to not more than     C. above the entrance temperature.

The thickness of the lasering plates should be such that, with the faces cooled as above described, the temperatures at the centers of the plates should not rise by more than about 1 C.

By making the outer surface of the jacket 16 a mirrored surface as above described, the level of illumination obtained from the mercury arc light tubes will be increased.

The absorption coefficient for pumping light in the laser plates may be adjusted by varying the percentage of doping used in the lasering material and thereby securing a constant absorption per unit volume of lasering material within a fraction of ±10 percent.

Electrical energy from any suitable source is supplied to the high-pressure mercury lamp tubes 15 and produces intense light to which the plates of lasering material are exposed on all sides. The mercury lamp tubes cause the plates 10 to laser, and the light energy may be emitted from one end or from both ends of the assembly of plates.

Figure 2:
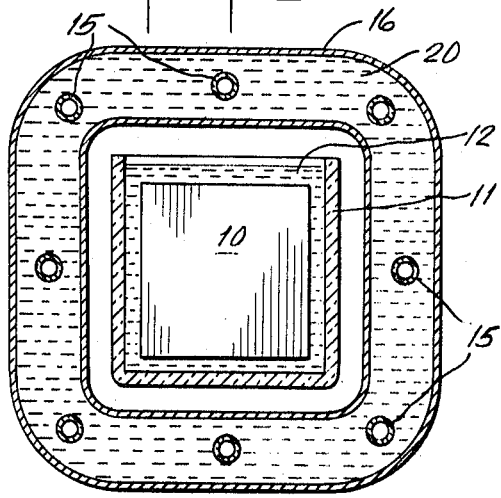
FIG. 2 is a sectional elevation on the line 2-2 of FIG. 1.
Figure 4:
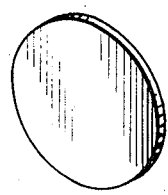
FIG. 4 is a perspective view of a circular disc plate which may be substituted for the plates shown in FIGS. 1, 2 and 3.

The plates, as indicated in FIG. 2, are square, but they may be made in the form of circular discs as shown in FIG. 4 or be made using circular discs and square or rectangular cladding.

Figure 3:
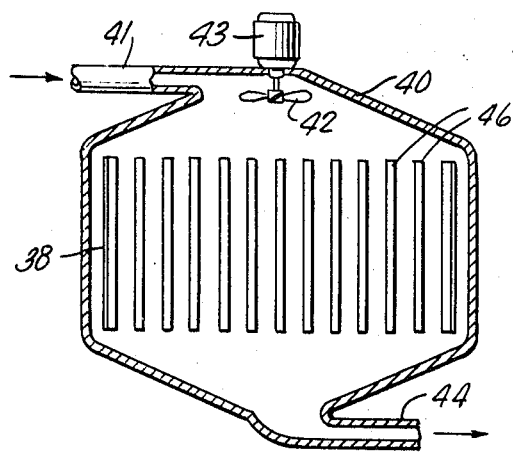
FIG. 3 is a partially sectional plan view of the laser structure in which cooling is provided by a gaseous medium.

Referring to FIG. 3, a tank or container 40 has an inlet pipe 41, a fan 42 driven by motor 43 and an outlet pipe 44 on the opposite side of the laser plates 46. Container 40 is preferably tapered or sloped so that a fluid coolant such as a gaseous coolant material may enter pipe 41 and be forced by fan 42 around and between each of the plates 46 and out through exit 44. Plates 46 correspond to the plates 10 and may be made square or circular.

The container 40 is formed of glass or other transparent material and is surrounded by a plurality of high-pressure mercury arc light tubes, as shown in FIG. 2, or other suitable means for imparting necessary light to cause the plates to laser.

By way of specific examples, two Fabry-Perot mirrors on flat glass plates are mounted on a supporting frame 10 centimeters apart. Let one of the mirrors be silvered for maximum reflectivity, and the other partially silvered for about 2 percent transmission. In the space between the mirrors are mounted a number of slabs of lasering material, ground with parallel faces, with normals to the slabs colinear with the normals of the mirrors. Spaces are left between the slabs of material to allow passage for the circulating coolant. The slabs may be discs about 1 centimeter in diameter, or squares about 1 centimeter on a side. It will be assumed that the effective absorption coefficient of the lasering slabs is adjusted, according to calculations hereinbefore described, so that when illuminated from at least two sides, the heat liberated in the lasering material will be uniform to within 5 percent.

Now with a space equal to the thickness of a slab left between each slab for coolant flow, there will be 5 centimeters of lasering material in the optical part between mirrors.

Considering first the use of neodymium glass, a thickness of glass of 1.26 cms. was found to experience a change in Fabry-Perot central fringe from light to dark to light with a change in temperature of 1.6° C. Five centimeters of glass would produce this change with 0.4° C. change. Since the above criterion is to maintain all optical paths across a diameter to $\Delta N' = \frac{1}{4}$, this means that only 0.1° C. of average temperature differential will be allowable along any perpendicular optical path between mirrors. Because of a first order averaging effect between the temperatures in the centers of the plates and the constant temperature of the coolant at the surfaces, one can allow 0.2° C. change in temperature at the centers of the plates, averaged over an optical path.

Now if pumping light energy could be supplied to the plates at an absolutely constant rate per unit volume, the central temperatures of the plates could be allowed to rise very high, and because of symmetry, the average temperature of dielectric along an optical path would remain constant to the required 0.1° C., provided the thicknesses of the plates are equal and the coolant is maintained at a constant temperature. However, as hereinbefore set forth, with simple geometries a 5 percent variation in energy liberated per unit volume is obtained under practical conditions. This means that the temperature rise of the centers of the plates should be restricted to $0.2 \times 20 = 4°$ C. From this information the thickness of the plates may be calculated. The temperature at the center of a plate is given by the relation:

$$U = U_o + \frac{Fa^2}{2K}$$

For neodymium glass assume $F = 11$ calories per second per square centimeter, $K = 2 \times 10^{-3}$, then with $u = u_o + 4°$ C.: $a = 0.38$ mm. (Half-thickness of plate) $2a = 0.76$ mm. as the desired thickness of plate.

Considering the case of ruby plates:

Ruby has a linear coefficient of expansion of $6.7 \times 10^{-6}$ compared with $7.6 \times 10^{-6}$ for flint glass. This means that the temperature change tolerance will be slightly larger by about 13 percent. Following the above discussion, the centers of the ruby slabs should be restricted to a temperature rise of 4.5° C.

For ruby assume a value of F of 110 calories per square centimeter per second, and a value of $K = 5 \times 10^{-2}$. $2a = 1.26$ mm. as the desired thickness of plates.

For cooling the plate assembly the efficiency will be highest if the index of refraction of the transparent coolant is the same as that of the plates for the lasering frequency light. This prevents losses due to reflections at the coolant-lasering material interfaces due to difference in index of refraction.

The structure of the present invention effectively prevents excessive heating of the laser material and development of deleterious temperature gradients therein, by greatly reducing the maximum distance between any internal point in the laser material and the nearest exposed surface thereof. In other words, because the laser material is divided into spaced thin plates with coolant fluid between them, no point within the interior of the laser material is more distant from a surface exposed to coolant than half the thickness of a plate; and the exposed surface area of the laser material includes not only the sidewalls (i.e., plate edges) but also the transverse parallel plate surfaces. Thus the present invention permits not only pulsed laser operation, but also continuous laser operation, without impairment of operating efficiency or output characteristics by excessive material heating or temperature gradients.

A related advantage inherent in the present structure is the minimization of so-called lensing effects that have resulted from temperature gradients in laser material bodies and may tend to cause objectionable widening of the beam spread angle of the laser light output. In this connection it may be explained that when heat is produced in a body of solid material, temperature gradients occur primarily in the direction of the shortest distance between interior (heated) portions of the body and the nearest exposed (cool) surface thereof Over most of the extent of a unitary elongated laser rod, the nearest exposed surface is the sidewall of the rod, and the shortest distance thereto from internal points in a rod is radial in direction, ie., with respect to the axis of laser light propagation through a rod. Consequently, the temperature gradients in such a rod are predominantly radial gradients; and it is these radial temperature gradients that produce the aforementioned lensing effects. In applicant's structure, on the other hand, over most of the extent of each thin plate, the nearest exposed surface is one of the transverse major plate surfaces and the shortest distance thereto from internal points in the plate is substantially transverse of the plate. Such temperature gradients as are developed in the plate, therefore, are predominantly axial, with the result that lensing effects are minimized. The elimination of lensing effects are desirable even at the expense of some decrease in efficiency of pumping due to less laser material being exposed to a side pumping flashlamp.

Still another advantage of the present structure is that it provides an optical aperture substantially equal to that of a conventional laser rod, because of the fact that the laser material is divided transversely of the axis of light propagation so that the effective cross-sectional area of laser material is substantially the same as the cross-sectional area of a unitary rod having a cross-sectional dimension equal to the transverse dimension of the plates. By way of comparison, if the laser material were divided longitudinally into plural thin rods to increase surface area, each of these rods extending along the axis of light propagation, the effective optical aperture would be materially reduced because an appreciable part of the total end area of the array of rods would not be occupied by laser material. Also, light diffraction would occur at the edge of each of the rods while in the structure of the present claims there is only a single circumferential edge at the optical aperture.

Still other inherent advantages of the present structure reside in the facility with which individual plates can be replaced if necessary due to damage during operation, or separately optically corrected to overcome small residual thermal distortion conditions or the like without requiring alterations in any other plate of the structure. Further, the individual plates can differ in composition from each other; for example, plates adjacent to the output end of the laser could be constituted of a laser material having high power density characteristics, while plates closer to the opposite end of the laser could be of a laser material having a lower power density characteristic but providing higher gain. Again, plates may be interchanged with others of different composition so as to tailor the laser structure for particular desired manner of operation.

The terms "laser" and "maser" as used herein are interchangeable, and this invention is not limited in this respect.

I claim:

1. In a laser device for use with a pumping source, a laser structure for substantially eliminating the lensing effects of index of refraction gradients in directions angular to the direction of laser propagation caused by temperature, comprising: a container; a plurality of generally parallel thin plates of lasering material spaced along said direction of laser propagation, each having a pair of opposed parallel laser propagation aperture faces supported in said container; and a temperature maintaining fluid immersing and contacting said faces and being transparent to laser energy emitted by said plates, whereby a substantially uniform temperature in the planes parallel to the planes of said faces is maintained by providing a thermal flow generally perpendicularly to said faces and generally parallel to the direction of said laser propagation.

2. The invention according to claim 1 wherein said fluid is heavy water.

3. The invention according to claim 1 wherein means are included for providing a flow of said fluid.

4. The invention according to claim 1 wherein said thin plates define edge surfaces and said fluid additionally immerses said edge surfaces.

5. In a laser device for use with a pumping source, a laser apparatus comprising: a plurality of laser plates having substantially parallel faces, means for supporting said laser plates to maintain adjacent plates of said laser plates in spaced parallel relation along the laser propagation path, the spaces between said plates forming fluid passages, a fluid transparent at wavelengths of laser light propagated by said plates and means for directing flow of said fluid through said passages across said parallel faces of said plates, in contact therewith, for causing a thermal flow generally perpendicularly to the planes of said plates and parallel to the direction of laser light propagation to minimize thermal gradients in said apparatus at an angle to said direction.

6. In a laser device including a pumping source, a laser structure arranged to substantially eliminate index of refraction gradients and density changes in the laser material during operation, comprising a container with a series of thin plates of lasering material supported therein, the plates being closely adjacent each other and aligned along a common optical path with respective opposed faces thereof in substantially opposed relation to next adjacent faces of an adjacent plate in the series, there being fluid in the container immersing and contacting said opposed faces of the series of plates, said fluid being transparent to laser and pumping energy, whereby said fluid is arranged to maintain a substantially constant temperature across the plane of each individual plate and whereby temperature induced radial index gradients in individual plate and whereby temperature induced radial index gradients in individual plates in the series are substantially eliminated.

7. The structure of claim 6 in which the fluid is selected from the group consisting of water, and heavy water.

8. The structure of claim 6 in which the series of plates are supported substantially perpendicular of the optical path.

9. The structure of claim 6 in which said plates are arranged at small angles to secure as nearly parallel light output as possible by restricting amplification of energy to the first allowed modes.

UNITED STATES PATENT OFFICE
CERTIFICATE OF CORRECTION

Patent No. 3,569,860             Dated March 9, 1971

Inventor(s) Eugene T. Booth

It is certified that error appears in the above-identified patent and that said Letters Patent are hereby corrected as shown below:

Column 8, lines 33 and 34, cancel "whereby temperature induced radial index gradients in individual plate and".

Signed and sealed this 30th day of May 1972.

(SEAL)
Attest:

EDWARD M. FLETCHER, JR.　　　　　　　　ROBERT GOTTSCHALK
Attesting Officer　　　　　　　　　　　　Commissioner of Patents